(12) United States Patent (10) Patent No.: US 12,643,184 B2
Priewasser et al. (45) Date of Patent: Jun. 2, 2026

(54) METHOD FOR PROVIDING A WORKPIECE SUPPORT UNIT FOR SUPPORTING A WORKPIECE

(71) Applicant: DISCO CORPORATION, Tokyo (JP)

(72) Inventors: Karl Heinz Priewasser, Munich (DE); Eugene Eurich, Munich (DE)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 18/830,197

(22) Filed: Sep. 10, 2024

(65) Prior Publication Data

US 2025/0083269 A1 Mar. 13, 2025

(30) Foreign Application Priority Data

Sep. 11, 2023 (DE) ..................... 10 2023 208 767.7

(51) Int. Cl.
B23Q 1/03 (2006.01)
(52) U.S. Cl.
CPC ..................................... B23Q 1/03 (2013.01)

(58) Field of Classification Search
CPC ....................................................... B23Q 1/03
See application file for complete search history.

(56) References Cited

U.S. PATENT DOCUMENTS

| | | | |
|---|---|---|---|
| 11,133,219 B2 * | 9/2021 | Priewasser | ........ H01L 21/02013 |
| 2017/0062278 A1 * | 3/2017 | Priewasser | .......... H01L 21/6836 |

* cited by examiner

*Primary Examiner* — Sarang Afzali
(74) *Attorney, Agent, or Firm* — Greer Burns & Crain Ltd.

(57) ABSTRACT

The present disclosure describes a method of providing a workpiece support unit for supporting a workpiece. The method comprises the steps of providing a carrier having a first side and a second side opposite to the first side, providing a protective sheeting, and providing an intermediate layer. The method also comprises the step of arranging the protective sheeting and the intermediate layer on the first side of the carrier by at least partially interposing the intermediate layer between the protective sheeting and the carrier so that an attachment force between said protective sheeting and said carrier is greater in a peripheral region of the first side of the carrier than in a center region of the first side of the carrier. The disclosure also proposes a workpiece support unit.

14 Claims, 7 Drawing Sheets

100

30
10
32
31
40
20
23

100

30
10
31
33
40
20
23

100

30
10
32
31
33
40
20
23

100

10
31
40
24
23
20

100

10
31
30
40
20
23

METHOD FOR PROVIDING A WORKPIECE SUPPORT UNIT FOR SUPPORTING A WORKPIECE

TECHNICAL FIELD

The present disclosure relates to a method of providing a workpiece support unit for supporting a workpiece, a method of preparing a workpiece for processing, a method of processing a workpiece, and a workpiece support unit.

BACKGROUND OF THE INVENTION

For handling a thin workpiece or applying high temperatures or a chemical treatment to a workpiece such as a substrate or a wafer, conventional surface protection tapes do not suffice for achieving the desired results. For this reason, support systems have been developed that use a carrier such as a support substrate made of glass or silicon. In such a support system, an adhesive is used to fix a wafer to the carrier.

Although these systems allow to process thin wafers and to use chemically demanding processes, it is often difficult to remove a wafer from such a carrier due to a strong fixation combined with the comparatively high stiffness of the carrier material. More specifically, the stability of the processing unit formed by the wafer, the adhesive and the carrier renders peeling off, sliding off, or lifting off the wafer from the carrier rather difficult and can cause cracks, chipping, or even breakage of the wafer. Also, for reusing a carrier, any residues left on its surface during previous use have to be removed to prevent an uneven processing result of the next wafer applied to the carrier.

Further, the carriers typically have a slightly larger diameter than the wafer ensuring that the edge of a wafer is properly supported. It has been found that at the circumference of a wafer the adhesive tends to be present on the circumferential surface of a wafer. This results, for example in case of grinding as processing method, in the adhesive getting unintentionally processed by a grinding wheel, in particular when a wafer is being processed to a very low thickness. The rotation of the grinding wheel grinds off the adhesive, which affects the grinding wheel due to clogging by and burning of ground off adhesive particles. Further, while rotating the grinding wheel transports these grinding particles onto the grinding surface of the wafer, possibly causing an uneven grinding result due to scratches as well as contamination with the adhesive remains.

SUMMARY OF THE INVENTION

Accordingly, it has been an objective to provide a workpiece support unit for processing a workpiece, a method for preparing a workpiece for processing, a method of processing a workpiece, and a support unit that address the above-described shortcomings of existing support systems.

The disclosure provides a method of providing a workpiece support unit for supporting a workpiece. The method comprises the steps of providing a carrier having a first side and a second side opposite to the first side, providing a protective sheeting, and providing an intermediate layer. The protective sheeting and the intermediate layer are arranged on the first side of the carrier by at least partially interposing the intermediate layer between the protective sheeting and the carrier so that an attachment force between said protective sheeting and said carrier is greater in a peripheral region of the first side of the carrier than in a center region of the first side of the carrier.

Arranging the intermediate layer on the carrier so that an attachment force between said protective sheeting and said carrier is greater in a peripheral region of the first side of the carrier than in a center region of the first side of the carrier facilitates removal of the protective sheeting from the carrier.

In other words, the intermediate layer is configured to prevent this layer from adhering to the first side of the carrier during and after its arrangement on the carrier. As a result, it can easily be removed from the carrier after processing. Thus, the intermediate layer is particularly configured so that it keeps non-adhesive properties when being subjected to subsequent processing of the workpiece. For example, this includes processes such as grinding, laser processing, etc. It particularly applies to high temperature processes such as metallization, annealing, etc. for processing a workpiece, in particular a workpiece for producing a semiconductor.

The peripheral region extends along the circumferential direction of the carrier and is preferably an annular region.

The intermediate layer may be arranged in the center region of the first side of the carrier and/or may be arranged in contact with said carrier and/or with said protective sheeting.

In other words, the intermediate layer may be directly applied to the carrier or may be applied with another layer or sheeting being interposed between the intermediate layer and the carrier/protective sheeting.

The intermediate layer may be formed of a material different from a material of the protective sheeting. It is preferably a sheet material, in particular a polyimide film or a polyethylene terephthalate (PET) film. The intermediate layer may be applied by coating the protective sheeting and/or the carrier.

Preferably, the protective sheeting is arranged in contact with the peripheral region of the first side of the carrier.

The protective sheeting may include a protective layer, said protective layer preferably being arranged in contact with the peripheral region of the first side of the carrier. The protective layer is preferably a polyolefin film.

The protective sheeting may include one or more additional layers, wherein the one or more additional layers is particularly an adhesive layer, a cushioning layer and/or a base sheet.

The method may also comprise the steps of providing one or more additional intermediate layers and interposing the one or more additional intermediate layers at least partially between the intermediate layer and the protective sheeting. The one or more additional intermediate layers (31) is, for example, an adhesive and/or a cushioning layer and/or a base sheet.

The protective sheeting preferably includes an adhesive arranged on a side for facing the workpiece and/or on a side for facing the carrier, wherein the adhesive is preferably provided on a circumferential or annular portion of the respective sides.

The workpiece particularly comprises a central device area and a peripheral marginal area surrounding said device area and the protective sheeting or adhesive contacts the workpiece in the peripheral marginal area of the workpiece.

If a ring frame is attached to the protective sheeting, the method preferably further includes after arranging the protective sheeting on the carrier, cutting the protective sheeting for separating the ring frame from the protective sheeting.

The carrier preferably includes a carrier substrate having a first side facing the protective sheeting and the intermediate layer as well as a second side opposite to the first side. The carrier preferably further includes an adhesive, the adhesive being preferably arranged on the first side of the carrier substrate, in particular in a peripheral region of the first side of the carrier substrate.

The carrier may further include at least one additional protective sheeting. The at least one additional protective sheeting may be arranged on the first side of the carrier or carrier substrate and/or on the second side of the carrier or carrier substrate. The at least one additional protective sheeting preferably comprises a protective layer, in particular a protective film. A ring frame may be attached to the at least one additional protective sheeting.

After arranging the protective sheeting on the first side of the carrier, the protective sheeting and the at least one additional protective sheeting preferably contact each other around the carrier substrate. In other words, they contact each other in a radial direction of the substrate outside the carrier substrate or in an area extending (partly or fully) around the carrier substrate. The area may or may not be adjacent to a circumferential edge of the carrier substrate.

This description also discloses a method of preparing a workpiece for processing, wherein the method comprises providing a workpiece and arranging the workpiece on a protective layer of the protective sheeting with or without an adhesive being arranged between the protective layer and the workpiece. The step of arranging the workpiece on a protective layer is performed before, during, or after any one of the steps of the method of providing a workpiece support unit as described above.

In above-noted method of preparing a workpiece for processing, a carrier is provided. However, the method of preparing a workpiece for processing may also initially prepare a workpiece without a carrier. Accordingly, a method of preparing a workpiece for processing is disclosed that comprises the steps of providing a workpiece, the workpiece having a front side and a back side, providing a protective sheeting, and providing an intermediate layer. The protective sheeting is arranged on the front side or the back side of the workpiece. The intermediate layer is arranged on the protective sheeting so that the intermediate layer and protective sheeting form a face side, wherein the face side is configured for mounting a first side of a carrier thereon and is further configured for providing an attachment force for said carrier that is greater in a peripheral region of the first side of the carrier than in a center region of the first side of the carrier. This distribution of an attachment force over the face side of protective sheeting and intermediate layer is particularly realized for an adhesive-free uniform first side of a carrier.

In other words, the face side formed by the intermediate layer and the protective sheeting is configured to provide above-noted advantages that will also be explained in more detail further below.

The present disclosure further presents a method of processing a workpiece, wherein the method comprises the steps of providing a workpiece support unit for supporting the workpiece in accordance with the description of above, arranging the workpiece on the protective sheeting on a side opposite to a side facing the carrier and the intermediate layer, and processing the workpiece.

The present disclosure also provides a workpiece support unit for supporting a workpiece, comprising a carrier having a first side and a second side opposite to the first side, a protective sheeting, and an intermediate layer. The protective sheeting and the intermediate layer are arranged on the first side of the carrier, wherein the intermediate layer is at least partially interposed between the protective sheeting and the carrier so that an attachment force between said protective sheeting and said carrier is greater in a peripheral region of the first side of the carrier than in a center region of the first side of the carrier.

The workpiece support unit is particularly provided using the method of providing a workpiece support unit according to the present disclosure.

In the workpiece support unit, the intermediate layer is preferably arranged in the center region of the first side of the carrier and/or in contact with said carrier and/or with said protective sheeting.

The intermediate layer may be formed of a material different from a material of the protective sheeting and is preferably a sheet material, in particular a polyimide film or a polyethylene terephthalate (PET) film. It may be provided as a coating on the protective sheeting and/or the carrier.

The protective sheeting is preferably arranged in contact with the peripheral region of the first side of the carrier.

The protective sheeting particularly includes a protective layer, said protective layer preferably being arranged in contact with the peripheral region of the first side of the carrier, wherein the protective layer is preferably a polyolefin film.

The protective sheeting may include one or more additional layers, wherein the one or more additional layers may, for example, be an adhesive layer, a cushioning layer, and/or a base sheet.

The workpiece support unit may further comprise one or more additional intermediate layers, wherein the one or more additional intermediate layers are preferably at least partially interposed between the intermediate layer and the protective sheeting. The one or more additional intermediate layers may, for example, be an adhesive layer, a cushioning layer, and/or a base sheet.

Above-noted protective sheeting may include an adhesive arranged on a side facing the workpiece and/or on a side facing the carrier, wherein the adhesive is preferably provided on a circumferential portion of the respective sides.

The workpiece may comprise a central device area and a peripheral marginal area surrounding said device area, wherein the protective sheeting particularly includes an adhesive arranged on a side facing the workpiece such that, when the protective sheeting is in contact with the workpiece, the adhesive is in contact with the peripheral marginal area of the workpiece.

A ring frame may be attached to the protective sheeting.

The carrier particularly includes a carrier substrate having a first side facing the protective sheeting and the intermediate layer, and a second side opposite to the first side, wherein the carrier preferably further includes an adhesive, the adhesive being preferably arranged on the first side of the carrier substrate, in particular in the peripheral region.

The carrier may further include at least one additional protective sheeting, wherein the at least one additional protective sheeting is arranged on the first side of the carrier or the carrier substrate and/or the at least one additional protective sheeting is arranged on the second side of the carrier or the carrier substrate.

The at least one additional protective sheeting preferably comprises a protective layer, in particular a polyolefin film.

Further, a ring frame may be attached to the at least one additional protective sheeting.

The protective sheeting and the at least one additional protective sheeting are preferably in contact with each other, wherein the protective sheeting and the at least one additional protective sheeting are more preferably in contact with each around the carrier substrate.

The described aspects of this disclosure particularly facilitate the separation of a carrier from the workpiece support unit (layer/sheeting by layer/sheeting or all layers and sheeting(s) at once) so that its reuse becomes more economical. Further, the support and protection of a wafer to be assembled with the workpiece support unit can be enhanced, which may result in a reduced total thickness variation due to processing.

Further, the workpiece may easily be separated from the workpiece support unit before or after the removal of the carrier (layer/sheeting by layer/sheeting or all layers and sheeting(s) at once).

In other words, the workpiece support unit and the methods related thereto allow for a complete removal of the carrier and preferably the workpiece from the workpiece support unit.

BRIEF DESCRIPTION OF THE FIGURES

The following figures illustrate exemplary embodiments of a workpiece support unit for supporting a workpiece and a method for providing a workpiece support unit according to the present disclosure. In these figures, same reference signs refer to features throughout the drawings that have the same or an equivalent function and/or structure. It is to be understood that the figures illustrate examples of the workpiece support unit and the corresponding method for providing the workpiece support unit according to the present disclosure without limiting the invention thereto.

DETAILED DESCRIPTION OF PREFERRED EMBODIMENTS

Figure 1A:
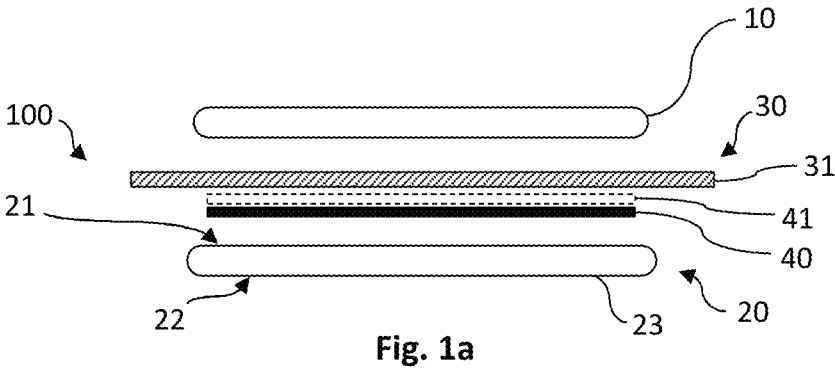
FIGS. 1a and 1b illustrate one exemplary embodiment of a workpiece support unit for supporting a workpiece according to the present disclosure and a workpiece supported thereon.

The workpiece support unit for supporting a workpiece, the method of providing a workpiece support unit, and the method of processing a workpiece according to the present disclosure are further described in more detail below with reference to the accompanying figures.

The present disclosure generally relates to a workpiece support unit 100 for supporting a workpiece 10 during processing thereof, a corresponding method of providing the workpiece support unit 100, and a method of processing the workpiece 10 while being supported on the workpiece support unit 100.

The workpiece 10 to be supported on the workpiece support unit 100 can generally be any (semiconductor) substrate or (semiconductor) wafer.

The substrate may, for example, comprise a semiconductor, glass, sapphire ($Al_2O_3$), a ceramic, such as an alumina ceramic, quartz, zirconia, PZT (lead zirconate titanate), a polycarbonate, an optical crystal material or the like.

In particular, the substrate may comprise silicon carbide (SiC), silicon (Si), gallium arsenide (GaAs), gallium nitride (GaN), gallium phosphide (GaP), indium arsenide (InAs), indium phosphide (InP), silicon nitride (SiN), lithium tantalate (LT), lithium niobate (LN), aluminium nitride (AlN), silicon oxide ($SiO_2$) or the like.

The substrate may be a single crystal substrate, a glass substrate, a compound substrate, such as a compound semiconductor substrate, e.g., a SiC, SiN, GaN or GaAs substrate, or a polycrystalline substrate, such as a ceramic substrate.

The substrate may be a wafer. For example, the substrate may be a semiconductor-sized wafer. Herein, the term "semiconductor-sized wafer" refers to a wafer with the dimensions (standardized dimensions), in particular, the diameter (standardized diameter), i.e., outer diameter, of a semiconductor wafer. The dimensions, in particular, the diameters, i.e., outer diameters, of semiconductor wafers are defined in the SEMI standards. For example, the dimensions of polished single crystal silicon (Si) wafers are defined in the SEMI standards M1 and M76. The semiconductor-sized wafer may be a 3 inch, 4 inch, 5 inch, 6 inch, 8 inch, 12 inch, or 18 inch wafer.

The substrate may be a semiconductor wafer. For example, the substrate may be made of any of the semiconductor materials listed above.

The substrate, such as a wafer, may be made of a single material or of a combination of different materials, e.g., two or more of the above-identified materials. For example, the substrate may be a Si and glass bonded wafer, in which a wafer element made of Si is bonded to a wafer element made of glass.

On the substrate, active layers or devices may be formed. Such active layers or devices are preferably formed on one side of the substrate. On this side, the substrate comprises a central device area, in which devices or active layers are formed, and a peripheral marginal area surrounding said device area. In said peripheral marginal area preferably no devices or active layers are formed. In the following, the side of the substrate having the device area formed thereon will generally be referred to as the front side of the substrate. Accordingly, the opposite side of the substrate will be referred to as the back side of the substrate.

The devices in the device area may be ICs (integrated circuits) and LSIs (large scale integrations). For example, the devices may also be semiconductor devices, power devices, optical devices, medical devices, electrical components, MEMS devices or combinations thereof. The devices may comprise or be, for example, transistors, such as MOSFETs or insulated-gate bipolar transistors (IGBTs), or diodes, e.g., Schottky barrier diodes.

The substrate may either be supported by the workpiece support unit 100 on the side of the substrate comprising the active layers or devices (i.e., on the front side of the substrate), or on the side opposite thereto (i.e., on a back side of the substrate).

The front side and/or the back side of the substrate may be substantially parallel. Moreover, the front side and/or the back side of the substrate may be substantially flat or even. However, the substrate may also have height differences on at least one side. In particular, the device area of the substrate may be formed with a plurality of protrusions, such as bumps, protruding from a plane surface of the substrate. These protrusions are used, for example, for establishing an electrical contact with the devices. The protrusions may lead to an uneven surface structure of the substrate.

The workpiece 10 is not limited to a specific shape. The workpiece 10 may be cylindrical and/or plate-shaped and may comprise cross-sections with outlines (defining a circumferential edge of the workpiece 10) that are substantially round, oval, or circular. In other words, in a top view of the workpiece 10, the workpiece 10 may have a round, oval, or circular shape.

However, the workpiece 10 may also comprise at least one linear section along the outline of the cross-sections. Particularly in a top view (or cross-section perpendicular to its longitudinal axis), the workpiece 10 may also have a polygonal (plate-)shape, such as a square or rectangular shape. Plate-shaped in the present context means that the workpiece 10 comprises a thickness, i.e., a longitudinal dimension, which is significantly smaller than a transversal/lateral dimension, e.g., a diameter, of the workpiece 10 (also, the workpiece is preferably cylindrical). The circumferential edge of the workpiece 10 may be rounded or chamfered.

Figure 1B:
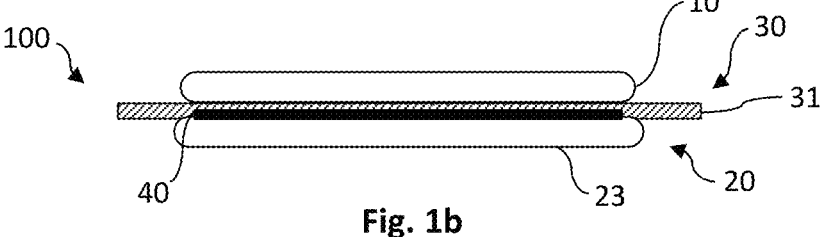

FIGS. 1a and 1b illustrate one embodiment of a workpiece support unit 100 for supporting a workpiece 10 and a workpiece 10 arranged on said workpiece support unit 100. FIG. 1a is an exploded view of the workpiece support unit 100 together with the workpiece 10. FIG. 1b illustrates an assembled state, in which the individual entities of the workpiece support unit 100 have been combined. Further, a workpiece 10 is supported on the workpiece support unit 100.

According to the embodiment illustrated in FIGS. 1a and 1b, the workpiece support unit 100 comprises a carrier 20, a protective sheeting 30 and an intermediate layer 40 which are each described in further detail below.

It should be noted that the Figures are schematic Figures for illustrating various configurations of the wafer support unit. For the purpose of illustration, the thicknesses of the sheetings, workpieces, and carriers are exaggerated. As a result, sheetings only appear to overlap with or be arranged in recesses of the workpieces and carriers in the thickness direction although this is not the case but a result of the exaggerated illustration.

It should also be noted that being "arranged" on, for example, the first side of the carrier does not necessitate physical contact between the protective sheeting and the first side of the carrier. For example, additional layers, such as an adhesive layer, may be interposed between the protective sheeting and the first side of the carrier.

The carrier 20 has a support function for the workpiece 10, in particular when load is applied to the workpiece 10 during processing thereof. The carrier 20 has a first side 21 and a second side 22 opposite to the first side 21. The first side 21 of the carrier 20 faces towards the protective sheeting 30 and the intermediate layer 40.

The carrier 20 may comprises a carrier substrate 23 with a first side facing towards the protective sheeting 30 and the intermediate layer 40, and a second side opposite to the first side. The first side and the second side of the carrier substrate 23 are preferably substantially parallel to each other.

The carrier substrate 23 is preferably plate-shaped and may comprise a cross-section with an outline (defining a circumferential edge of the carrier substrate 23) that is substantially round, oval, or circular. However, the carrier substrate 23 may also comprise at least one linear section along the outline of the cross-section. In particular, the carrier substrate 23 may also be a square or rectangular, preferably plate-shaped body. The circumferential edge of the carrier substrate 23 may be formed as a rounded or chamfered edge.

It is preferred that the carrier substrate 23 is formed of a relatively hard or stiff material or substrate such that it can provide desired support for the workpiece 10. In particular, the carrier substrate 23 may provide greater resistance against bending than the workpiece 10. The carrier substrate 23 may be formed of the same substrate as the workpiece 10 but is not limited to a specific material or substrate. It is particularly preferred that the carrier substrate 23 is formed of glass or silicon (Si).

The carrier substrate 23 is preferably heat resistant to the temperatures that occur during processing such as grinding, laser processing, etc. This particularly also applies to high temperature processing such as metallization, annealing, etc. of the material of the workpiece 10 (for producing semiconductors, i.e. a semiconductor material or workpiece). Accordingly, the carrier substrate 23 preferably has at least the same level of heat resistance as the workpiece 10.

The carrier 20 and/or the carrier substrate 23 preferably has a (slightly) larger lateral dimension than the workpiece 10 to be supported thereon. For example, the diameter of the carrier 20 and/or carrier substrate 23 may be (slightly) larger than the diameter of the workpiece 10. For example, the carrier 20 and/or carrier substrate 23 protrudes in a range of 0.1 to 5.0 mm, particularly 0.5 mm to 2.5 mm beyond the edge of the workpiece.

This ensures that the workpiece 10, in particular the circumferential edge thereof, is properly supported by the carrier 20 such that damage to the workpiece 10 during processing is prevented.

Nonetheless, the carrier 20 and/or carrier substrate 23 may have a lateral dimension that is essentially the same as the lateral dimension of the workpiece 10. This has the advantage that an existing equipment setup may not have to be adjusted so that the implementation of the present method and workpiece support unit in existing production processes is rendered particularly easy.

The second side 22 of the carrier 20 and/or the second side of the carrier substrate 23 may be held on a chuck table (not illustrated). The carrier 20 may particularly be held on a chuck table when processing the workpiece 10. The carrier 20 may be held on the chuck table under suction.

In a method of providing a workpiece support unit according to the present disclosure, the method comprises the step of providing a carrier 20 as described above.

The protective sheeting 30 serves as a protective layer for the workpiece 10 and/or for the carrier 20. The protective sheeting 30 may provide protection from breakage, deformation, and/or contamination by debris, for example, during processing of the workpiece 10. One side of the protective sheeting 30 faces towards the workpiece 10 to be supported and another side of the protective sheeting 30, opposite to the one side, faces towards the intermediate layer 40 and the carrier 20.

The protective sheeting 30 may be formed of a material which adheres to the carrier 20 and/or the workpiece 10, for example by applying heat. In particular, the protective sheeting 30 may be made of a plastic material, such as a polymer. For example, the protective sheeting 30 may be made of a polyolefin, such as polyethylene (PE), polypropylene (PP) or polybutylene (PB).

The protective sheeting 30 may have a thickness in the range of 5 to 500 μm, preferably 5 to 200 μm, more preferably 8 to 100 μm, even more preferably 10 to 80 μm and yet even more preferably 12 to 50 μm.

In the present embodiment, the protective sheeting 30 has in a top view a substantially circular shape and an outer diameter which is greater than the outer diameter of the workpiece 10 and/or the carrier 20 (carrier substrate 23). In other embodiments, the outer diameter of the protective sheeting 30 may be smaller, e.g., slightly smaller, or substantially the same as an outer diameter of the workpiece 10 and/or of the carrier 20 (carrier substrate 23).

The protective sheeting 30 is preferably a sheet material. As illustrated in FIGS. 1a and 1b, the protective sheeting 30 comprises a (single) protective layer 31. It is particularly preferred that the protective layer 31 is a polyolefin film.

In further embodiments, the protective sheeting 30 may also comprise one or more additional layers. Further layers of the protective sheeting 30 may be formed of the same or different material as the protective layer 31. In particular, further layers of the protective sheeting 30 may be an adhesive layer, a cushioning layer, and/or a base sheet.

The base sheet and/or the cushioning layer may be desired for absorbing height differences or an uneven surface structure of the workpiece 10. In particular, protrusions, such as bumps, may be embedded within the cushioning layer. This allows to enhance the support of the workpiece 10 on the carrier 20 even if the workpiece 10 comprises an uneven surface structure while lowering the risk of damaging the workpiece 10 during processing thereof.

The material of the cushioning layer is not particularly limited. In particular, the cushioning layer may be formed of any type of material which allows for protrusions protruding along the thickness direction of the workpiece 10 to be embedded therein. For example, the cushioning layer may be formed of a resin, an adhesive, a gel or the like.

The cushioning layer may be curable by an external stimulus, such as UV radiation, heat, an electric field and/or a chemical agent. In this case, the cushioning layer hardens at least to some degree upon application of the external stimulus thereto. For example, the cushioning layer may be formed of a curable resin, a curable adhesive, a curable gel or the like.

The cushioning layer may be configured so as to exhibit a degree of compressibility, elasticity and/or flexibility after curing thereof, i.e., to be compressible, elastic and/or flexible after curing. For example, the cushioning layer may be such that it assumes a rubber-like state by curing. Alternatively, the cushioning layer may be configured so as to essentially reach a rigid, hard state after curing.

A base sheet may be attached to the cushioning layer. The material of the base sheet is not particularly limited. The base sheet may be made of a soft or pliable material, such as, for example, a polymer material, e.g., polyvinyl chloride (PVC), ethylene vinyl acetate (EVA) or a polyolefin. Alternatively, the base sheet may be made of a rigid or hard material, such as polyethylene terephthalate (PET) and/or silicon and/or glass and/or stainless steel (SUS).

As illustrated in FIG. 1b, in the state in which the workpiece 10 is supported on the workpiece support unit 100, the workpiece 10 is in contact with the one side of the protective sheeting 30. In particular, the side of the workpiece 10 on which devices or active layers are formed (i.e., the front side) or the side opposite thereto (i.e., the back side) may be in contact with the one side of the protective sheeting 30. However, in other embodiments, there may also be at least one additional layer 41 between the protective sheeting 30 and the intermediate layer 40.

In the method of providing a workpiece support unit 100 according to the present disclosure, the method comprises the step of providing a protective sheeting 30 as described above.

The workpiece support unit 100 further comprises an intermediate layer 40. The intermediate layer 40 comprises one side facing towards the protective sheeting 30 (or towards an optional additional intermediate layer 41), and another side, opposite to the one side, facing towards the carrier 20.

The intermediate layer 40 is preferably formed of a material different than the material of the protective sheeting 30. In particular, the intermediate layer 40 may be formed of a material having only little or substantially no attachment force to other layers or components, in particular to the carrier 20. Moreover, it is preferred that the material of the intermediate layer 40 is resistant to heat. Preferably, the intermediate layer is heat resistant up to 180° C. and, more preferably, up to 400° C. This particularly configures the intermediate layer to keep its non-adhesive properties during processing of the workpiece.

It is particularly preferred that the intermediate layer 40 is a polyimide film, such as poly (4,4'-oxydiphenylene pyromellitimide; tradename: Kapton) or a polyethylene terephthalate (PET) film.

The intermediate layer 40 may be a sheet material or may be applied as a coating to the protective sheeting 30 and/or the carrier 20.

In the present embodiment, the intermediate layer 40 has a substantially circular shape in top view. A lateral dimension (e.g., width or diameter) of the intermediate layer 40 may be greater or less than a lateral dimension (e.g., width or diameter) of the carrier 20 (carrier substrate 23) and/or the protective sheeting 30. In some embodiments, the intermediate layer 40 has substantially the same or greater lateral dimension (e.g., width or diameter) as a device area formed on the workpiece 10.

In the method of providing a workpiece support unit 100 according to the present disclosure, the method comprises the step of providing an intermediate layer 40 as described above.

As can be taken from FIGS. 1*a* and 1*b*, the protective sheeting 30 is arranged together with the intermediate layer 40 on the first side 21 of the carrier 20. The intermediate layer 40 is interposed between the protective sheeting 30 and the carrier 20 so that an attachment force between said protective sheeting 30 and said carrier 20 is greater in a peripheral region of the first side 21 of the carrier 20 than in a center region of the first side 21 of the carrier 20.

In the method of providing a workpiece support unit 100 according to the present disclosure, the method comprises the step of arranging the protective sheeting 30 and the intermediate layer 40 on the first side 21 of the carrier 20 by at least partially interposing the intermediate layer 40 between the protective sheeting 30 and the carrier 20 so that an attachment force between said protective sheeting 30 and said carrier 20 is greater in a peripheral region of the first side 21 of the carrier 20 than in a center region of the first side 21 of the carrier 20.

The workpiece support unit 100 disclosed herein provides an effective alternative for reliably fixing and supporting a workpiece 10 on a carrier 20 without using an adhesive. Even if the workpiece 10 is processed to a relatively low thickness, there is no risk that a processing unit, such as a grinding wheel, interferes with adhesive on the circumferential surface of the workpiece 10. Moreover, no additional steps for cleaning the workpiece 10 and/or the carrier 20 (specifically for reusing the latter for supporting another workpiece 10) from adhesive residue are necessary.

The intermediate layer 40 further provides the technical effect of avoiding a direct attachment of the protective sheeting 30 to the carrier 20 over the entire side of the protective sheeting 30 facing the carrier 20. Thereby, the intermediate layer 40 effectively lowers the attachment force between the protective sheeting 30 and the carrier 20, specifically in the center region of the first side 21 of the carrier 20. The attachment force between the protective sheeting 30 and the carrier 20 in a peripheral region of the first side 21 of the carrier 20 is however maintained (preferably by the intermediate layer 40 having a smaller lateral dimension than the protective sheeting 30 and the carrier 20).

This allows for a removal or separation (i.e., peeling off, sliding off, or lifting up) of the workpiece 10 (together with the protective sheeting 30) from the carrier 20 being facilitated, while significantly lowering the risk of causing damage to the workpiece 10 during the removal or separation process. At the same time, the attachment force between the protective sheeting 30 and the carrier 20 is maintained in a peripheral region of the first side 21 of the carrier 20, allowing reliable fixation of the workpiece 10 (together with the protective sheeting 30) on the carrier 20.

The protective sheeting 30 further provides a sealing effect for the intermediate layer 40. In particular, the intermediate layer 40 can be sealed by the protective sheeting 30 along the circumference of the intermediate layer 40. Thereby, penetration of air in between the intermediate layer 40 and the carrier 20 which may cause an unintentional separation of the protective sheeting 30 from the carrier 20 can be prevented or even entirely avoided.

Moreover, the protective sheeting 30 also provides a protective effect for the carrier 20 and/or the carrier substrate 23. For example, the carrier 20 may be protected against debris generated during processing of the workpiece 10. This promotes maintaining and simplifying reusability of the carrier 20.

If the intermediate layer 40 is of substantially the same size (or even greater) than a device area formed on the workpiece 10, the attachment force of the protective sheeting 30 to the carrier 20 can be reduced specifically in the region where devices or active layers are present on the workpiece 10. During peeling off, sliding off or lifting off the workpiece 10 together with the protective sheeting 30 from the carrier 20, particularly the load applied to the devices or active layers can be considerably reduced. Thus, the risk of damaging devices or active layers during separation or removal of the workpiece 10 from the carrier 20 is noticeably reduced.

Additionally, the workpiece support unit 100 disclosed herein can be used for multiple processing steps of the workpiece 10, thereby avoiding the need of remounting the workpiece 10 to another tape or substrate. In other words, the workpiece support unit 100 is suitable for being used for, e.g., grinding, polishing, etching, annealing, metallization, lithography, plasma dicing, laser processing and/or mechanical dicing of the workpiece 10.

After arranging the protective sheeting 30 and the intermediate layer 40 on the first side 21 of the carrier 20, the intermediate layer 40 may be at least partially integrated or embedded within the protective sheeting 30. In other words, the protective sheeting 30 may at least partially encompass the intermediate layer 40.

In other words, the intermediate layer 40 may be held on the carrier 20 by the protective sheeting 30 in a form-fit manner. This may be particularly preferred for cases in which the intermediate layer 40 does not or is not intended to establish a strong attachment force to the carrier 20 by itself. An unintentional displacement of the intermediate layer 40 on the carrier 20 is, thus, avoided.

According to the embodiment illustrated in FIG. 1*b*, the protective sheeting 30, in particular the protective layer 31, is in contact with the peripheral region of the first side 21 of the carrier 20 and/or with the intermediate layer 40. This is however not limiting. In other embodiments, there may also additional layers, such as an adhesive layer, be arranged between the protective sheeting 30 and the carrier 20 and/or between the protective sheeting 30 and the intermediate layer 40 such that there is no contact.

This enhances the reliability of the fixation of the workpiece 10 combined with the protective sheeting 30 on the carrier 20 such that, when load is applied to the workpiece 10 during processing, an unintentional separation of the protective sheeting 30 from the carrier 20 is avoided.

The intermediate layer 40 may be in contact with the first side 21 of the carrier 20, in particular with the first side of the carrier substrate 23. It is particularly preferred that no adhesive is arranged between the intermediate layer 40 and the carrier 20.

Due to the intermediate layer 40 being formed of a material having only little or substantially no attachment force to the carrier 20, an attachment force between the protective sheeting 30 to the carrier 20 can be reduced significantly. This alleviates peeling off, sliding off, or lifting the workpiece 10 together with the protective sheeting 30 from the carrier 20.

As illustrated in FIGS. 1*a* and 1*b*, the intermediate layer 40 is entirely interposed between the protective sheeting 30 and the carrier 20. In further embodiments, the intermediate layer 40 may be at least partially interposed in between the two.

It is preferred that the intermediate layer 40 is arranged in the center region of the first side 21 of the carrier 20. In other words, it is preferred that the intermediate layer 40 is not present in at least part(s) of a peripheral region of the first side 21 of the carrier 20.

Optionally and as schematically illustrated in FIG. 1a, one or more additional intermediate layers 41 can be provided.

If one or more additional intermediate layers 41 are present, they are arranged on the first side 21 of the carrier 20 by at least partially interposing the one or more additional intermediate layers 41 between the intermediate layer 40 and the protective sheeting 30. As described above, additional intermediate layers 41 may, for example, be an adhesive layer, a cushioning layer, and/or a base sheet.

In the method of providing a workpiece support unit 100 according to the present disclosure, the method may further comprise the step of providing one or more additional intermediate layers 41, and interposing the one or more additional intermediate layers 41 at least partially between the intermediate layer 40 and the protective sheeting 30.

An additional intermediate layer 41 may particularly be for attaching the intermediate layer 40 to the protective sheeting 30 and/or to avoid an unintentional separation of the protective sheeting 30 and the intermediate layer 40.

When arranging the protective sheeting 30 and the intermediate layer 40 (and optionally one or more additional intermediate layers 41) on the first side 21 of the carrier 20, each individual layer may be arranged or laminated one-by-one on the first side 21 of the carrier 20 or on the second side of the protective sheeting 30.

Alternatively, the protective sheeting 30 and the intermediate layer 40 (and optionally one or more additional intermediate layers 41) may be prearranged with some or all of the individual layers. In this case, the prearranged layers are arranged or laminated on the first side 21 of the carrier 20 in one step.

The protective sheeting 30 may also be arranged or laminated on the front side or back side of the workpiece 10 and then be arranged or laminated on the first side 21 of the carrier 20.

During and/or after applying the protective sheeting 30 and the intermediate layer 40 (and possibly additional intermediate layers 41) to the first side 21 of the carrier 20, an external stimulus may be applied to the protective sheeting 30 so that the protective sheeting 30 is attached to the first side 21 of the carrier 20. An attachment force between the protective sheeting 30 and the carrier 20 holding the protective sheeting 30 in its position on the carrier 20 is, thus, generated through the application of the external stimulus. Hence, no additional adhesive material may be necessary for attaching the protective sheeting 30 to the first side 21 of the substrate 20.

In particular, by applying the external stimulus to the protective sheeting 30, a form fit, such as a positive fit, (in particular if no adhesive is used) and/or a material bond, such as an adhesive bond, may be formed between the protective sheeting 30 and the carrier 20. The terms "material bond" and "adhesive bond" define an attachment or connection between the protective sheeting 30 and the carrier 20 due to atomic and/or molecular forces acting between these two components.

The term "adhesive bond" relates to the presence of these atomic and/or molecular forces which act so as to attach or adhere the protective sheeting 30 to the carrier 20, and does not imply the presence of an additional adhesive between protective sheeting 30 and carrier 20.

Applying the external stimulus to the protective sheeting 30 may consist of or comprise heating the protective sheeting 30 and/or cooling the protective sheeting 30 and/or applying pressure to the protective sheeting 30 and/or applying a vacuum to the protective sheeting 30 and/or irradiating the protective sheeting 30 with radiation, such as light or UV radiation, e.g., by using a laser beam.

The external stimulus may comprise or be a chemical compound and/or electron or plasma irradiation and/or a mechanical treatment, such as vacuum, pressure, friction or ultrasound application, and/or static electricity.

If applying the external stimulus to the protective sheeting 30 consists of or comprises heating the protective sheeting 30, the method may further comprise allowing the protective sheeting 30 to cool down after the heating process. In particular, the protective sheeting 30 may be allowed to cool down to its initial temperature, i.e., to the temperature prior to the heating process.

An attachment force between the protective sheeting 30 and the carrier 20 is generated through the heating process. The attachment of the protective sheeting 30 to the carrier 20 may be caused in the heating process itself and/or in a subsequent process of allowing the protective sheeting 30 to cool down. The protective sheeting 30 may be softened by the heating process. Upon cooling down, e.g., generally to its initial temperature, the protective sheeting 30 may reharden, e.g., so as to create a form fit and/or a material bond to the carrier 20.

The method may further comprise during and/or after arranging the protective sheeting 30 and the intermediate layer 40 on the first side 21 of the carrier 20 the application of pressure to the protective sheeting 30 and/or to the carrier 20. In this way, the protective sheeting 30 and the intermediate layer 40 are pressed against the first side 21 of the carrier 20. Thus, it can particularly be ensured in an efficient way that the protective sheeting 30 is reliably attached to the carrier 20. The pressure may, for example, be applied by a pressing mechanism.

The protective sheeting 30 and the intermediate layer 40 may be arranged on the first side 21 of the carrier 20 in a reduced pressure atmosphere, in particular, under a vacuum. In this way, it can be reliably ensured that no voids and/or air bubbles are present between the protective sheeting 30 and the first side 21 of the carrier or between the intermediate layer 40 and the first side 21 of the carrier 20 which may cause the risk of an unintentional separation of the protective sheeting 30 or the intermediate layer 40 from the carrier 20. The workpiece 10 (together with the protective sheeting 30) can thus be fixed more reliably on the carrier 20.

For example, the step or steps of arranging the protective sheeting 30 and the intermediate layer 40 to the first side 21 of the carrier 20 may be carried out in a vacuum chamber. After the carrier 20 and the protective sheeting 30 and intermediate layer 40 have been loaded into the vacuum chamber, the chamber is evacuated. Optionally, air may be supplied through an air inlet port to a rubber membrane, causing the rubber membrane to expand into the evacuated chamber. In this way, the rubber membrane is moved downward in the vacuum chamber so as to push the protective sheeting 30 and the intermediate layer 40 against the first side 21 of the carrier 20.

Subsequently, the vacuum in the vacuum chamber is released and the protective sheeting 30 and the intermediate layer 40 are held in its position on the first side 21 of the carrier 20 by the attachment force generated between the protective sheeting 30 and the carrier 20. When releasing the vacuum, the atmospheric pressure may also exert a pressing force causing the protective sheeting 30, the intermediate layer 40 and the carrier 20 to be pressed together. In this way, no separate pressing mechanism or rubber membrane as described above may be necessary.

FIGS. 2a to 2e illustrate modifications of the embodiment of the workpiece support unit 100 according to the present disclosure and illustrated in FIGS. 1a and 1b referred to above. Different embodiments of a workpiece support unit 100 with an adhesive applied thereto are described below. Generally, it is preferred that no adhesive material contacts devices or active layers formed on the workpiece 10 (in a state in which the workpiece 10 is supported on the workpiece support unit 100). It is further preferred that no adhesive material contacts the center region of the first side 21 of the carrier 20.

Thereby, it is ensured that devices or active layers formed on the workpiece 10 are not contaminated with an adhesive. Moreover, debonding of the workpiece 10 from the protective sheeting 30, debonding of the workpiece 10 (together with the protective sheeting) from the carrier 20, and cleaning of the workpiece 10 and of the carrier 20 is facilitated.

Figures 2A, 2B, 2C, 2D, 2E:
FIGS. 2a to 2e illustrate modifications of the exemplary embodiment of the workpiece support unit for supporting a workpiece according to the present disclosure illustrated in FIGS. 1a and 1b and a workpiece supported thereon.

As illustrated in FIG. 2a, the protective sheeting 30 described above may include an adhesive 32. The adhesive 32 may be arranged on the side facing the workpiece 10 to be supported on the workpiece support unit 100. The adhesive 32 may be provided on a circumferential portion of the protective sheeting 30, in particular on a circumferential portion of the protective layer 31. The circumferential portion provided with an adhesive preferably corresponds to a peripheral marginal area surrounding the device area of the workpiece 10.

In embodiments in which the protective sheeting 30 includes an adhesive 32 arranged on the side facing the workpiece 10, it is preferred that, in a state, in which the front side of the workpiece 10 is arranged on the protective sheeting 30, the adhesive 32 contacts the peripheral marginal area surrounding the device area of the workpiece 10. In other words, it is particularly preferred that the adhesive 32 does not contact the device area of the workpiece 10. Also in a state, in which the back side of the workpiece 10 is arranged on the protective sheeting 30, the adhesive 32 contacts a peripheral marginal area of the workpiece's back side that is opposite to and corresponds to the peripheral marginal area on the front side surrounding the device area of the workpiece 10. Thus, it is likewise particularly preferred that in case the adhesive 32 is contacting the back side, it does not contact an area of the back side corresponding to the device area of the workpiece 10 on its front side.

According to FIG. 2b, the protective sheeting 30 may, additionally or alternatively to the adhesive 32, include an adhesive 33 arranged on the side facing the carrier 20 and the intermediate layer 40. The adhesive 33 may be provided on a circumferential portion of the protective sheeting 30, in particular on a circumferential portion of the protective layer 31 (i. e. with an annular shape). The adhesive 33 may however also be provided over the (substantially) entire side of the protective sheeting 30 (protective layer 31) facing the carrier 20.

FIG. 2c is an embodiment of the workpiece support unit 100 which is a combination of the embodiments illustrated in FIGS. 2a and 2b. In this embodiment, the protective sheeting 30 includes the adhesives 32 and 33 on the side facing the workpiece 10 to be supported and on the side facing the carrier 20 and the intermediate layer 40, respectively. The adhesives 32 and 33 may be arranged as described above with respect to the embodiments illustrated in FIGS. 2a and 2b.

In further embodiments and as illustrated in FIG. 2d, the carrier 20 may include an adhesive 24. The adhesive 24 may be arranged on the peripheral region of the carrier 20. Specifically, the adhesive 24 may be arranged on the first side of the carrier substrate 23 facing the protective sheeting 30 and the intermediate layer 40, in particular on a peripheral region or annular peripheral region of the first side of the carrier substrate 23.

Although not illustrated, other embodiments of the workpiece support unit 100 may comprise the carrier 20 including the adhesive 24 as described above with respect to FIG. 2d, and the protective sheeting 30 including the adhesive 32 and/or the adhesive 33 as described above with respect to FIG. 2a, 2b, or 2c.

In alternative embodiments and as illustrated in FIG. 2e, neither the protective sheeting 30 nor the carrier 20 comprises an adhesive. Such an embodiment corresponds to the embodiment illustrated in FIGS. 1a and 1b.

By applying the adhesives described above, the attachment force between the individual layers or components can be adjusted according to the application of the workpiece support unit 100. The risk of an unintentional separation of the individual layers or components of the workpiece support unit 100 is, thus, reduced.

Figure 3A:
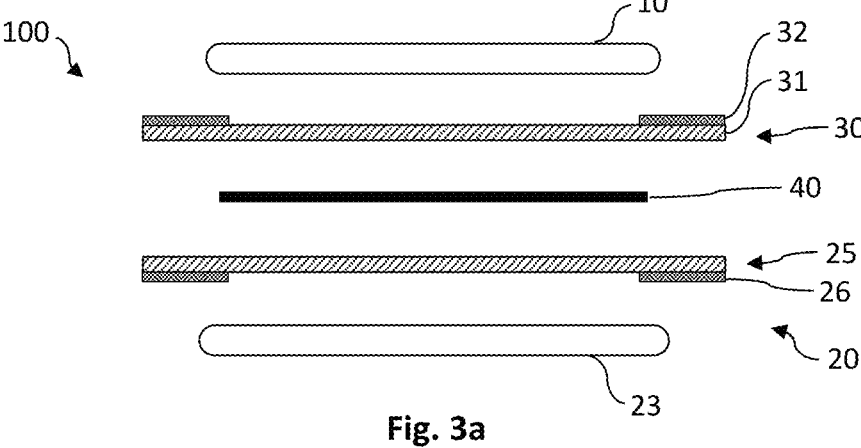
FIGS. 3a and 3b illustrate a further exemplary embodiment of a workpiece support unit for supporting a workpiece according to the present disclosure and a workpiece supported thereon in which the carrier includes an additional protective sheeting.
Figure 3B:
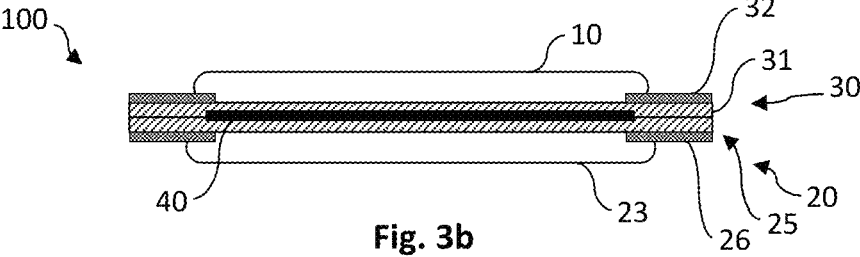

FIGS. 3a and 3b illustrate another exemplary embodiment of a workpiece support unit 100 for supporting a workpiece 100 according to the present disclosure. FIG. 3a illustrates an exploded view of the workpiece support unit 100 together with the workpiece 10 supported thereon. FIG. 3b illustrates an assembled state in which the individual entities of the workpiece support unit 100 have been combined with the workpiece 10 supported thereon.

The workpiece 10, the carrier 20, the protective sheeting 30, and the intermediate layer 40 are the same as described above with respect to the embodiments illustrated in FIGS. 1a to 2e. Therefore, the description above including the technical effects achieved by the workpiece support unit 100 equally applies to the embodiment illustrated in FIGS. 3a and 3b.

According to FIGS. 3a and 3b, the carrier 20 further comprises an additional protective sheeting 25. The additional protective sheeting 25 has one side facing towards the protective sheeting 30 and the intermediate layer 40, and another side, opposite to the one side, facing towards the carrier substrate 23. The additional protective sheeting 25 may be arranged on the first side of the carrier substrate 23.

The additional protective sheeting 25 may be of the same type as the protective sheeting 30. Therefore, the previous description with respect to the configuration of the protective sheeting 30 and with respect to the method of arranging the protective sheeting 30 on the carrier 20, preferably equally applies to the additional protective sheeting 25 and the method of arranging the additional protective sheeting 25 on the carrier substrate 23.

As can be taken from FIG. 3b, in a state in which the protective sheeting 30 and the intermediate layer 40 are arranged on the first side 21 of the carrier 20, the protective sheeting 30 and the additional protective sheeting 25, specifically the (annular) circumferential portions thereof, are in contact. In other words, the protective sheeting 30 and the additional protective sheeting 25 are in contact around the intermediate layer 40. The protective sheeting 30 and the additional protective sheeting 25 contact each other along a predetermined width in the lateral direction.

In this case, the intermediate layer 40 is sealed in between the protective sheeting 30 and the additional protective sheeting 25. By sealing the intermediate layer 40 between the two protective sheetings 25 and 30, air is prevented from entering in the space between the intermediate layer 40 and the protective sheetings 25 and 30. Further, the additional protective sheeting 25 allows for sealing the space between the first side 21 of the carrier 20 and the additional protective sheeting 25, in particular by applying an external stimulus. As in the case for the protective sheeting 30, the protective sheeting 25 may be softened by heat resulting in above-described form fit and/or material bond.

Consequently, arranging the protective sheetings 25 and 30 may prevent air penetration at the level of the intermediate layer 40, while the intermediate layer still facilitates removal of the workpiece 10 and the protective sheeting 30 as well as the additional protective sheeting 25. In particular the application of an external stimulus, such as heat and/or vacuum, enhances the sealing effect for preventing penetration of surrounding air.

An absence of an adhesive between the first side 21 of the carrier 20 and the additional protective sheeting 25 facilitates removal or peeling off of these material layers from the carrier after processing of the workpiece 10.

Further, the risk of an unintentional separation of the protective sheeting 30 from the carrier 20 can be prevented, in particular when load is applied to the workpiece 10 during processing. An unintentional separation can also be prevented if the workpiece 10 and the workpiece support unit 100 are subjected to a high temperature (for example in a range of 100° C. to 400° C.) or to a vacuum. For example, this is the case for metallization, annealing, or a plasma treatment. In these circumstances, it is advantageous to prevent air from entering between layers. Accordingly, the above allows for fixing and supporting the workpiece 10 on the carrier 20 more reliably.

At the same time, this embodiment keeps the effect of facilitating the separation of the workpiece 10 from the carrier 20. Although the protective sheeting 30 and the additional protective sheeting 25 are sealed along a circumferential (annular) portion, a sharp or pointy member (not illustrated), such as a blade, cutter, knife or wedge, can be inserted from an outer circumferential position in between the sheetings 25 and 30. Thereby, the protective sheetings 25 and 30 can be easily separated. The intermediate layer 40 has the effect of reducing the attachment force between the protective sheeting 30 and the center region of the first side 21 of the carrier 20, which tends to be more difficult to reach with the sharp member. Therefore, the workpiece 10 (together with the protective sheeting 30) can still be easily separated from the carrier 20.

The additional protective sheeting 25 may or may not include an adhesive 26. The adhesive 26 may be provided on the side facing the carrier substrate 23, specifically on a circumferential (annular) portion of the additional protective sheeting 25. This facilitates peeling off of the additional protective sheeting 25. Nonetheless, the adhesive 26 may also be provided on the entire side facing the carrier substrate 23.

Although not illustrated, the additional protective sheeting 25 may additionally or alternatively also include an adhesive provided on the side facing the protective sheeting 30 and the intermediate layer 40. The adhesive may be provided (only) in a circumferential (annular) portion of the side facing the protective sheeting 30 and the intermediate layer 40 or over substantially the entire side.

As illustrated in FIGS. 3a and 3b, in this embodiment neither the protective sheeting 30 nor the additional protective sheeting 25 include an adhesive on the sides facing the intermediate layer 40. In alternative embodiments, however, either the protective sheeting 30 or (alternatively) the additional protective sheeting 25 includes an adhesive on the side facing the intermediate layer 40. In other words, it is preferred that only one of the protective sheeting 30 and the additional protective sheeting 25 includes an adhesive on the side facing the intermediate layer 40.

Figure 4:
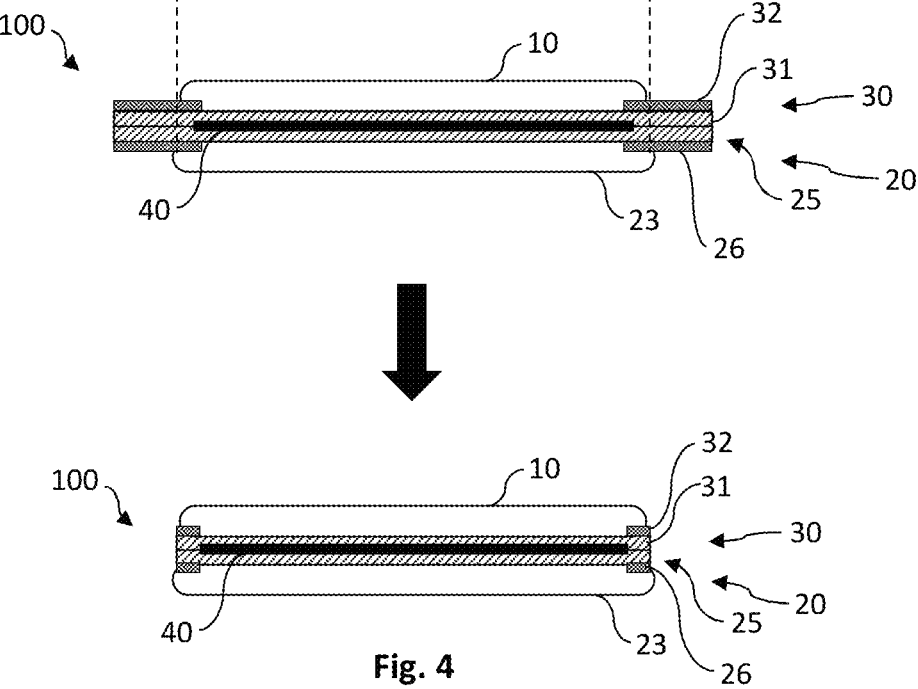
FIG. 4 illustrates an exemplary step of cutting protective sheetings of a workpiece support unit in a method of providing a workpiece support unit for supporting a workpiece according to the present disclosure.

FIG. 4 illustrates a step of cutting an assembly of protective sheetings 25 and 30 of a workpiece support unit 100 of the method of providing a workpiece support unit 100 according to the present disclosure.

The protective sheeting 30 and/or the additional protective sheeting 25 may have a circumferential excess portion which extends laterally beyond the lateral dimensions of the workpiece 10 and/or the carrier substrate 23 (e.g. for mounting the workpiece support unit 100 to a ring frame). The protective sheeting 30 and/or the additional protective sheeting 25 may be cut to separate said circumferential excess portions.

The position along which the protective sheeting 30 and/or the additional protective sheeting 25 is cut is illustrated by the dashed lines in FIG. 4. The position along which the protective sheetings 25, 30 are cut is preferably predetermined such that after cutting, a width along which the protective sheeting 30 and the additional protective sheeting 25 are in contact is equal to or greater than a predetermined minimum width. This minimum width is configured so that the protective sheeting 30 and the additional protective sheeting 25 adhere to each other in an area surrounding the circumference of the intermediate layer 40. Preferably, the surrounding area has a width in a range of 1 mm to 5 mm, in particular 1 mm to 3 mm.

Thereby, it is ensured that the sealing effect of the intermediate layer 40 between the protective sheetings 25 and 30 described above is maintained.

After the cutting step, the protective sheeting 30 and/or the additional protective sheeting 25 may no longer comprise circumferential excess portions extending laterally beyond lateral dimensions of the workpiece 10 and/or the carrier substrate 23.

The cutting step described above facilitates handling of the workpiece support unit 100 and the workpiece 10 attached thereto for certain processing steps since unnecessary circumferential excess portions of the protective sheetings 25 and 30 have been removed. At the same time, the sealing effect of the intermediate layer 40 between the two protective sheetings 25 and 30 is kept for a reliable fixation of the workpiece 10 on the carrier 20.

Although FIG. 4 illustrates the cutting step with respect to the embodiment of the workpiece support unit 100 as shown in FIGS. 3a and 3b, the cutting step may correspondingly be applied to the embodiments illustrated in FIGS. 1a to 2e.

Figure 5:
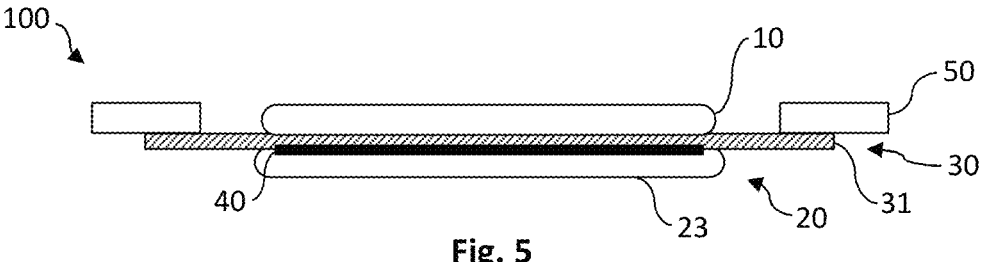
FIG. 5 illustrates another exemplary embodiment of a workpiece support unit for supporting a workpiece according to the present disclosure in which a ring frame is attached to a protective sheeting.

FIG. 5 illustrates a further exemplary embodiment of a workpiece support unit 100 according to the present disclosure. According to this embodiment, a ring frame (annular frame) 50 may be attached to the protective sheeting 30, in particular to the protective layer 31. A circumferential portion of the protective sheeting 30 (protective layer 31) is attached to the ring frame 50 such that the protective sheeting 30 closes a central opening of the ring frame 50, i.e., the area inside the inner diameter of the ring frame 50.

As illustrated in FIG. 5, the ring frame 50 may be attached to the side of the protective sheeting 30 facing the workpiece 10 to be supported. However, the ring frame 50 may also be provided on the side of the protective sheeting 30 facing the intermediate layer 40 and the carrier 20. The ring frame 50 may surround the workpiece 10 and/or the carrier 20 (carrier substrate 23).

In the present embodiment, the step of attaching the ring frame 50 to the protective sheeting 30 is performed before arranging the protective sheeting 30 on the carrier 20. In this way, the handling of the protective sheeting 30, in particular, when arranging the protective sheeting 30 on the carrier 20, is facilitated. Further, after arranging the protective sheeting 30 on the carrier 20, the workpiece support unit 100 can be held by the ring frame 50 through the protective sheeting 30. Thus, handling and transport of the workpiece support unit 100 is also facilitated.

Although FIG. 5 illustrates the ring frame 50 with respect to the embodiment of the workpiece support unit 100 as shown in FIGS. 1a and 1b, a ring frame 50 being attached to the protective sheeting 30 is not limited thereto. That is, a ring frame may also be attached to the protective sheeting 30 and/or the additional protective sheeting 25 of any one of the embodiments shown in FIGS. 2a to 4.

Figure 6:
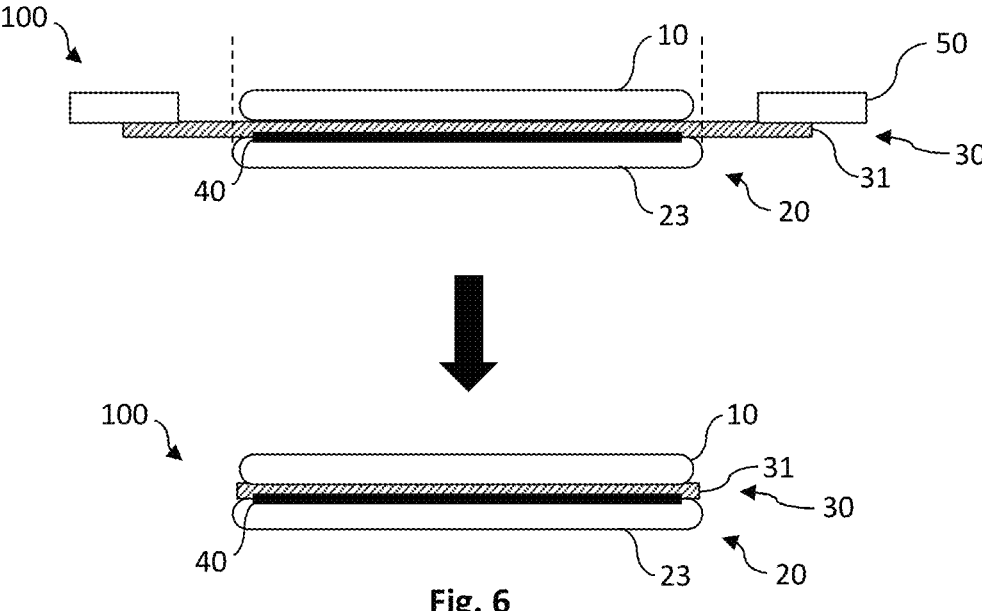
FIG. 6 illustrates an exemplary step of cutting a protective sheeting of a workpiece support unit for separating a ring frame from the protective sheeting in a method of providing a workpiece support unit for supporting a workpiece according to the present disclosure.

In FIG. 6, another step of cutting the protective sheeting 30 of the workpiece support unit 100 according to the method of providing the workpiece support unit 100 is illustrated.

For all or some processing steps of the workpiece 10, it may be desirable to separate the ring frame 50 from the protective sheeting 30. However, the present disclosure is not limited thereto. To do so, the protective sheeting 30 may be cut at positions indicated by dashed lines in FIG. 6. The position along which the protective sheeting 30 is preferably a predetermined position such that after cutting, a width along which the protective sheeting 30 is in contact with the carrier 20 is equal to or greater than a predetermined minimum width (for example, a minimum width in a range of 1 mm to 5 mm or 1 mm to 3 mm). Thereby, the sealing effect of the intermediate layer 40 as well as a reliable fixation of the protective sheeting 30 (and, thus, of the workpiece 10) on the carrier 20 are maintained.

Since the workpiece support unit 100 may generally be used for multiple processing steps of the workpiece 10, the above-described cutting step allows a relatively easy adaption of the workpiece support unit 100 for individual processing steps.

Hence, there is no need for remounting the wafer to another support apparatus.

Figure 7:
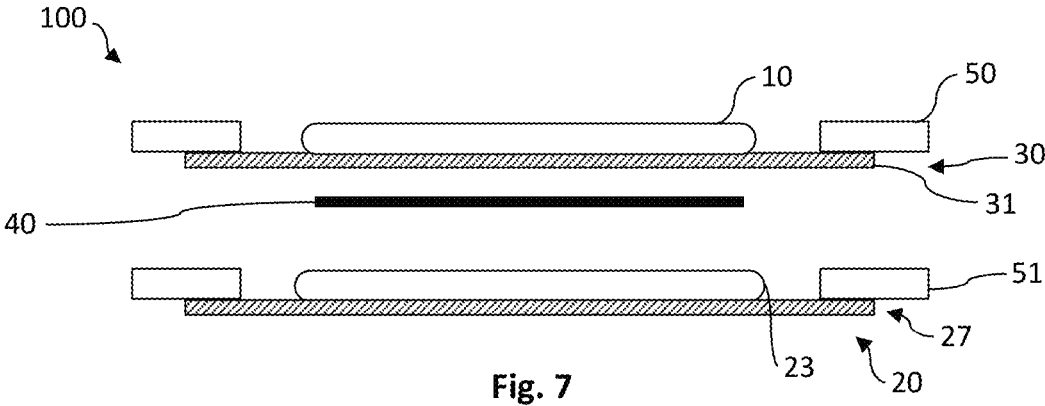
FIG. 7 illustrates another exemplary embodiment of a workpiece support unit for supporting a workpiece according to the present disclosure in which the carrier includes another additional protective sheeting.
Figure 8:
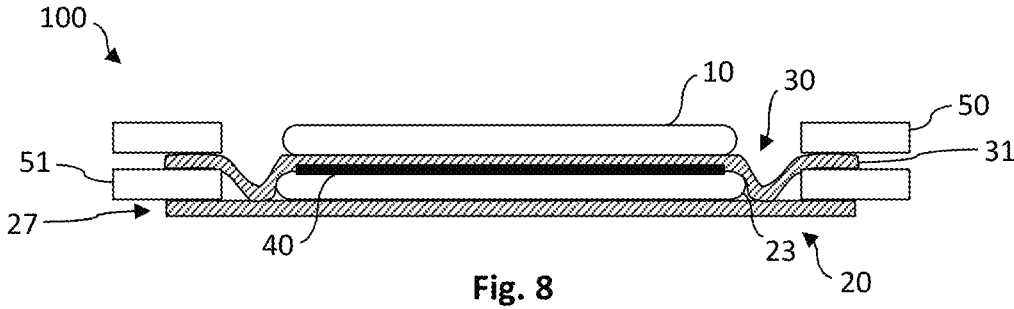
FIG. 8 illustrates the exemplary embodiment of the workpiece support unit of FIG. 7 in a state in which protective sheetings have been brought into contact around the carrier substrate.
Figure 9:
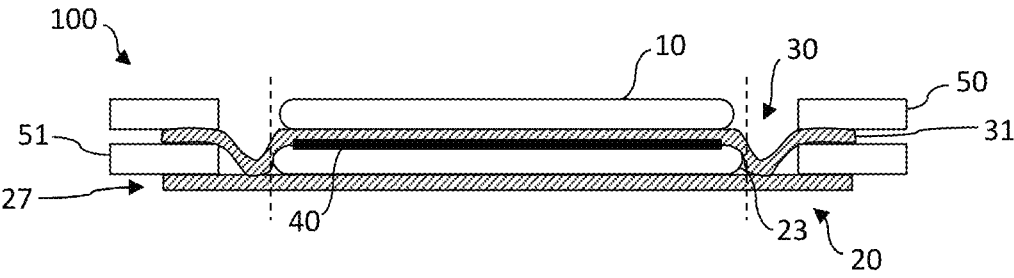
FIG. 9 illustrates the state of the exemplary embodiment of the workpiece support unit as shown in FIG. 8, wherein dashed lines indicate positions along which protective sheetings are cut for separating ring frames attached to the protective sheetings in a method of providing a workpiece support unit according to the present disclosure.
Figure 10:
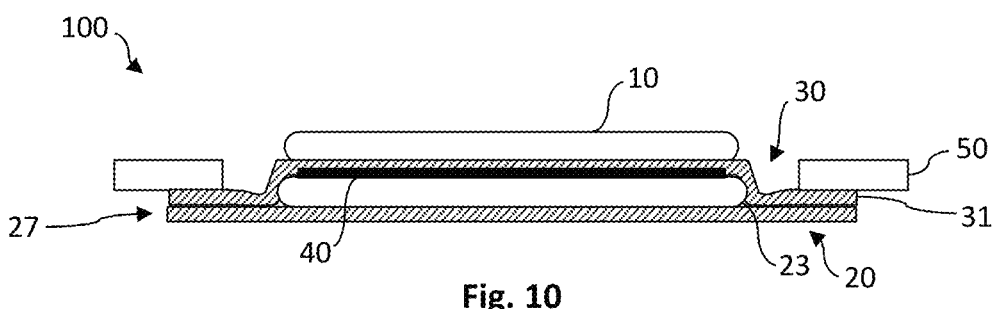
FIG. 10 illustrates another exemplary embodiment of a workpiece support unit according to the present disclosure in which no ring frame is attached to the additional protective sheeting included in the carrier, in a state, in which protective sheetings have been brought into contact around the carrier substrate.

FIGS. 7 to 10 illustrate further embodiments of the workpiece support unit 100 according to the present disclosure. FIG. 7 illustrates an exploded view of the workpiece support unit 100 together with the workpiece 10 supported thereon. FIGS. 8 to 10 illustrates assembled states in which the individual entities of the workpiece support unit 100 have been brought together with the workpiece 10 supported thereon.

The workpiece 10, the carrier 20, the protective sheeting 30, and the intermediate layer 40 are the same as described above with respect to FIGS. 1a to 6. Therefore, the description above including the technical effects achieved by the workpiece support unit 100 correspondingly applies to the embodiments illustrated in FIGS. 7 to 10.

According to FIGS. 7 to 10, the carrier 20 further comprises an additional protective sheeting 27. The additional protective sheeting 27 may be arranged on the second side of the carrier substrate 23 (i.e., the side opposite to the side facing the protective sheeting 30 and the intermediate layer 40).

The additional protective sheeting 27 may be of the same type as the protective sheeting 25 or 30 described above. Therefore, the previous description with respect to the structural aspects of the protective sheetings 25 and 30, but also with respect to the method of arranging the protective sheetings 25 and 30 on the carrier 20, correspondingly applies to the additional protective sheeting 27 and the method of arranging the additional protective sheeting 27 on the carrier substrate 23.

Preferably, the additional protective sheeting 27 is a heat resistant tape.

Optionally and as shown in FIGS. 7 to 9, a ring frame 51 may be attached to the additional protective sheeting 27, in particular on the side facing the carrier substrate 23. However, the ring frame 51 may also be provided on the side opposite to the side facing the carrier substrate 23.

The ring frame 51 may be of the same type and/or dimension as the ring frame 50. The ring frame 51 may also be larger or smaller than the ring frame 50. For example, a lateral dimension (e.g., width or diameter) of the ring frame 51 may be greater than the lateral dimension (e.g., width or diameter) of the ring frame 50. In other words, in the embodiment illustrated in FIGS. 7 to 9, the ring frames 50 and 51 are preferably configured so that they may be assembled with the protective sheeting 30 sandwiched in between.

The step of attaching the ring frame 51 to the additional protective sheeting 27 is performed before arranging the protective sheeting 27 on the carrier substrate 23. The ring frame 51 has the same technical effect as the ring frame 50 described above, that is, facilitating the handling of the protective sheeting 27 and of the workpiece support unit 100.

In FIGS. 8 to 10, a state in which the protective sheeting 30 and the intermediate layer 40 have been arranged on the first side 21 of the carrier 20 is illustrated. As depicted, the protective sheeting 30 and the additional protective sheeting 27 are in contact around the carrier substrate 23 (in particular along an annular-shaped portion).

In this case, the intermediate layer 40 is sealed in between the protective sheeting 30 and the additional protective sheeting 27 such that the sealing effect described above applies.

FIG. 10 corresponds to an alternative embodiment in which no ring frame 51 is attached to the additional protective sheeting 27. In this embodiment, the width along which the protective sheetings 27 and 30 are in contact with each other is increased. This allows an enhanced sealing effect of the intermediate layer 40 between the sheetings 27 and 30.

In alternative embodiments, however, the protective sheeting 30 and the additional protective sheeting 27 may not be in contact with each other.

As can be seen from FIGS. 8 to 10, the protective sheeting 30 closely follows the contour of the carrier substrate 23, in particular along the rounded or chamfered edge of the carrier substrate 23. Hence, the area of attachment of the protective sheeting 30 to the carrier 20 (carrier substrate 23) is increased. This has the purpose of an improved attachment between the protective sheeting 30 and the peripheral region of the first side 21 of the carrier 20. The fixation of the workpiece 10 and the protective sheeting 30 to the carrier 20 is, thus, improved.

As further illustrated in FIGS. 8 and 9 for embodiments with ring frames 50 and 51, in a state, in which the protective sheeting 30 has been arranged on the first side 21 of the carrier 20, a circumferential (annular) portion of the protective sheeting 30 may be sandwiched between the ring frame 50 and the ring frame 51.

In FIG. 9, dashed lines illustrate positions along which the protective sheetings 27 and 30 may be cut to separate the ring frames 50 and 51 from the protective sheetings 27 and 30. The step of cutting the protective sheetings 27 and 30 essentially corresponds to the cutting steps as described above with respect to FIGS. 4 and 6. The skilled person will appreciate that the cutting step may also be applied to the embodiment illustrated in FIG. 10.

In further embodiments of the workpiece support unit 100 according to the present disclosure, the carrier 20 may include both additional protective layers 25 and 27.

In a method of processing a workpiece 10, the method comprises the step of providing a workpiece support unit 100 for supporting the workpiece 10 as described above. Subsequently, the workpiece 10 is arranged on the protective sheeting 30, in particular on a side of the protectives sheeting 30 opposite to a side facing the carrier 20 and the intermediate layer 40.

However, in accordance with the present disclosure, the sequence of arranging the sheeting(s), the layer(s), the carrier, and the workpiece is not particularly limited.

For example, the method may comprise the step of applying a protective layer 31 with or without an adhesive 32 (as described) to a front side or a back side of a workpiece 10. The application of the protective layer 31 is preferably performed in a vacuum (i.e. using a vacuum chamber) and even more preferably using heat during and/or after the application or lamination of the protective layer 31.

Using a vacuum and/or heat results in the protective layer 31 following the height differences (i.e., protrusions or recesses) on the surface of the workpiece 10. As a result, the protective layer 31 is securely attachable, in particular in its central region (in particular corresponding to a device area on either side of the workpiece 10), to the workpiece without the use of an adhesive. Further, the protective layer 31 (in particular as a part of a workpiece support unit 100) can easily and completely be removed so that essentially no post-processing of the workpiece for removal of residual material of the workpiece support unit is needed.

The protective layer 31 may also be attached to a ring frame 50 before or after the application of the protective layer 31 to a front side or back side of a workpiece 10. The attachment to a ring frame 50 may also be performed during or essentially at the same time as the application of the protective layer 31 to the workpiece.

Either before, during (in particular at the same time), or after the application of the protective layer 31 to the workpiece 10, an intermediate layer 40 may be attached to the protective layer 31 on the side of the protective layer 31 opposite to its side facing the workpiece 10 (optionally with an additional layer 41 arranged/sandwiched in between).

This aspect of the method allows for making multiple workpieces (e.g. wafers) ready for further processing, resulting in enhancing the efficient fabrication.

Then, the workpiece 10 is processed by performing one or multiple processing steps.

Processing of the workpiece 10 while being supported on the workpiece support unit 100 may include (but is not limited to) grinding, polishing, etching, plasma dicing, laser processing and/or mechanical dicing. Processing of the workpiece 10 may also additionally or alternatively include the formation of modified layers within the workpiece 10 by focusing a pulsed laser beam having a transmission wavelength to the material of the workpiece 10 inside the workpiece 10. Moreover, annealing, metallization or lithography processing of the workpiece 10 may be performed.

For some applications, it is preferred that after performing one or more processing steps on the workpiece 10, the configuration of the workpiece support unit 100 is changed before performing one or more further processing steps on the workpiece 10. For example, the configuration of the workpiece support unit 100 may be changed by cutting one or more of the protective sheetings 25, 27, and 30 as described above.

The invention claimed is:

1. A method of providing a workpiece support unit for supporting a workpiece, the method comprising:
   providing a carrier substrate having a first side and a second side opposite to the first side;
   providing a protective sheeting;
   providing an intermediate layer; and
   arranging the protective sheeting and the intermediate layer on the first side of the carrier substrate by partially interposing the intermediate layer between the protective sheeting and the carrier substrate so that an attachment force between said protective sheeting and said carrier substrate is greater in a peripheral region of the first side of the carrier substrate than in a center region of the first side of the carrier substrate,
   wherein the intermediate layer is arranged in direct contact with the carrier substrate in the center region of the first side of the carrier substrate, and
   wherein the intermediate layer is arranged in direct contact with said protective sheeting.

2. The method of providing a workpiece support unit according to claim 1,
   wherein the intermediate layer is formed of a material different from a material of the protective sheeting.

3. The method of providing a workpiece support unit according to claim 1,
   wherein the intermediate layer is a sheet material comprising a polyimide film.

4. The method of providing a workpiece support unit according to claim 1,
   wherein the intermediate layer is applied by coating at least one of the protective sheeting and the carrier substrate.

5. The method of providing a workpiece support unit according to claim 1,
   wherein the protective sheeting is arranged in contact with the peripheral region of the first side of the carrier substrate.

6. The method of providing a workpiece support unit according to claim 1,
   wherein the protective sheeting includes a protective layer, said protective layer being arranged in contact with the peripheral region of the first side of the carrier substrate, and
   wherein the protective layer is a polyolefin film.

7. The method of providing a workpiece support unit according to claim 1,
   wherein the protective sheeting includes one or more additional layers,
   wherein the one or more additional layers may be at least one of an adhesive layer, a cushioning layer and a base sheet.

8. The method of providing a workpiece support unit according to claim 1, the method further comprising:
   providing one or more additional intermediate layers; and interposing the one or more additional intermediate layers at least partially between the intermediate layer and the protective sheeting, wherein the one or more additional intermediate layers may be at least one of an adhesive, a cushioning layer and a base sheet.

9. The method of providing a workpiece support unit according to claim 1, wherein the protective sheeting includes an adhesive arranged on at least one of a side facing the workpiece and a side facing the carrier substrate, wherein the adhesive is provided on a circumferential portion of the at least one of the side facing the workpiece and the side facing the carrier substrate.

10. The method of providing a workpiece support unit according to claim 1, wherein the first side of the carrier substrate faces the protective sheeting and the intermediate layer, and wherein the carrier substrate further includes an adhesive, the adhesive being arranged on a peripheral region of the first side of the carrier substrate.

11. The method of providing a workpiece support unit according to claim 1, wherein the carrier substrate further includes at least one additional protective sheeting.

12. The method of providing a workpiece support unit according to claim 11, wherein the at least one additional protective sheeting is arranged on at least one of the first side of the carrier substrate and the second side of the carrier substrate.

13. The method of providing a workpiece support unit according to claim 11, wherein the at least one additional protective sheeting comprises a protective film.

14. The method of providing a workpiece support unit according to claim 11, wherein, after arranging the protective sheeting on the first side of the carrier substrate, the protective sheeting and the at least one additional protective sheeting contact each other around the carrier substrate.

\* \* \* \* \*